(12) United States Patent
Fannin et al.

(10) Patent No.: US 10,620,462 B1
(45) Date of Patent: Apr. 14, 2020

(54) SOLUTION FOR LCD IMAGE PERSISTENCE

(71) Applicant: Rockwell Collins, Inc., Cedar Rapids, IA (US)

(72) Inventors: Timothy R. Fannin, Urbana, IA (US); Russ D. Uthe, Ely, IA (US); Eric N. Anderson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 52 days.

(21) Appl. No.: 15/945,709

(22) Filed: Apr. 4, 2018

(51) Int. Cl.
  *G02F 1/133* (2006.01)
  *G02F 1/1335* (2006.01)

(52) U.S. Cl.
  CPC .... *G02F 1/13318* (2013.01); *G02F 1/133509* (2013.01); *G02F 1/133603* (2013.01); *G02F 1/133617* (2013.01); *G02F 2001/133618* (2013.01); *G02F 2001/133624* (2013.01); *G02F 2202/12* (2013.01); *G02F 2203/11* (2013.01)

(58) Field of Classification Search
  None
  See application file for complete search history.

(56) References Cited

U.S. PATENT DOCUMENTS

2013/0278577 A1* 10/2013 Beon ............... G06F 3/0412
                                                       345/207

* cited by examiner

*Primary Examiner* — James A Dudek
(74) *Attorney, Agent, or Firm* — Donna P. Suchy

(57) ABSTRACT

An LCD is described. The LCD includes an LCD panel and a backlight. The LCD panel includes a plurality of LCD elements arranged in an array, each element configured to change its light transmission based on a voltage applied to the LCD element. The backlight is configured to provide light to the LCD elements of the LCD panel. The backlight includes one or more visible light elements providing visible light to the LCD panel, and includes one or more non-visible light elements, different from the visible light elements, providing non-visible light to the LCD panel at a wavelength such that the non-visible light increases the photoconductivity of the LCD elements.

20 Claims, 2 Drawing Sheets

US 10,620,462 B1

SOLUTION FOR LCD IMAGE PERSISTENCE

The inventive concepts disclosed herein generally relate to the field of LCD displays.

BACKGROUND

Liquid crystal displays (LCDs) are known types of displays. An LCD typically includes an LCD panel, which includes an array of LCD elements. Each LCD element acts as a shutter allowing a variable amount of light through based on electrical control. The LCD elements are typically pixels, with three color elements, such as RGB, per pixel element. In dynamic displays, the LCD elements are controlled to be refreshed many times a second, such as at a 60 Hz rate, for example.

SUMMARY

In one aspect, embodiments of the inventive concepts disclosed herein are directed to an LCD. The LCD includes an LCD panel and a backlight. The LCD panel includes a plurality of LCD elements arranged in an array, each element configured to change its light transmission based on a voltage applied to the LCD element. The backlight is configured to provide light to the LCD elements of the LCD panel. The backlight includes one or more visible light elements providing visible light to the LCD panel, and includes one or more non-visible light elements, different from the visible light elements, providing non-visible light to the LCD panel at a wavelength such that the non-visible light increases the photoconductivity of the LCD elements.

In a further aspect, embodiments of the inventive concepts disclosed herein are directed to a method of operating an LCD including an LCD panel having a plurality of LCD elements arranged in an array, where each element is configured to change its light transmission based on a voltage applied to the LCD element. The method includes providing visible light to the LCD panel via one or more visible light elements. The method further includes providing non-visible light to the LCD panel, via one or more non-visible light elements different from the visible light elements, at a wavelength such that the non-visible light increases the photoconductivity of the LCD elements.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Embodiments of the inventive concepts disclosed herein regarding an LCD display including non-visible light elements in the backlight address a problem of a persistent image in low intensity light ambient conditions. If an LCD element does not receive any electric signal, the LCD element will retain its current level which decays with time. The speed of the decay is dependent upon the intensity of light that is impinging upon the LCD element, where a larger intensity of light provides an increased photoconductivity, and resultant greater speed of decay (small decay time) of the LCD element. In low intensity light ambient conditions the photoconductivity is lower, and the LCD elements of an LCD panel may hold an image for several seconds as the image decays. The non-visible light elements provide non-visible light to the LCD elements which increase the photoconductivity and the speed of decay to overcome the persistent image problem.

Figure 1:
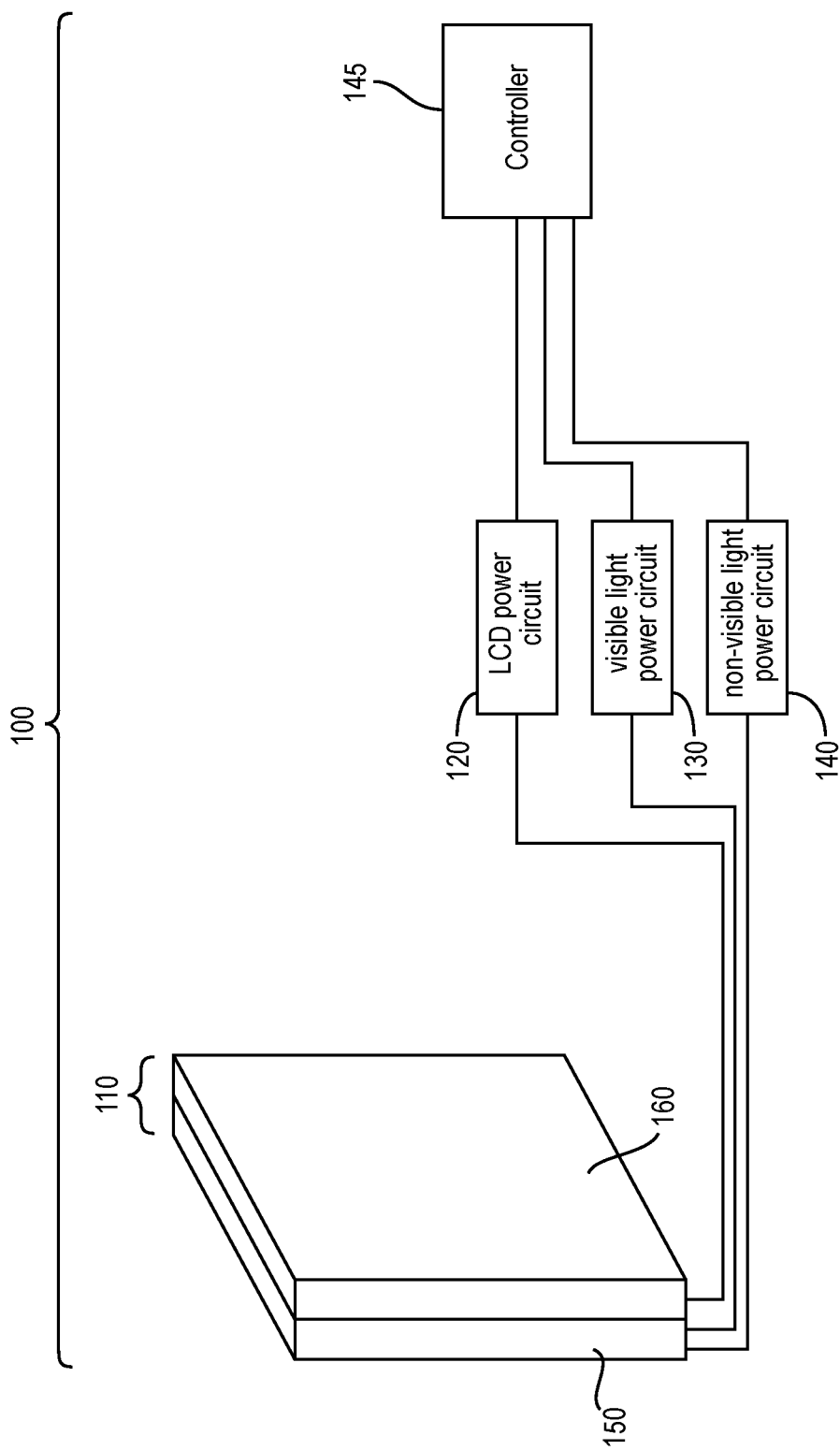
FIG. 1 illustrates an LCD according to inventive concepts disclosed herein.
Figure 2:
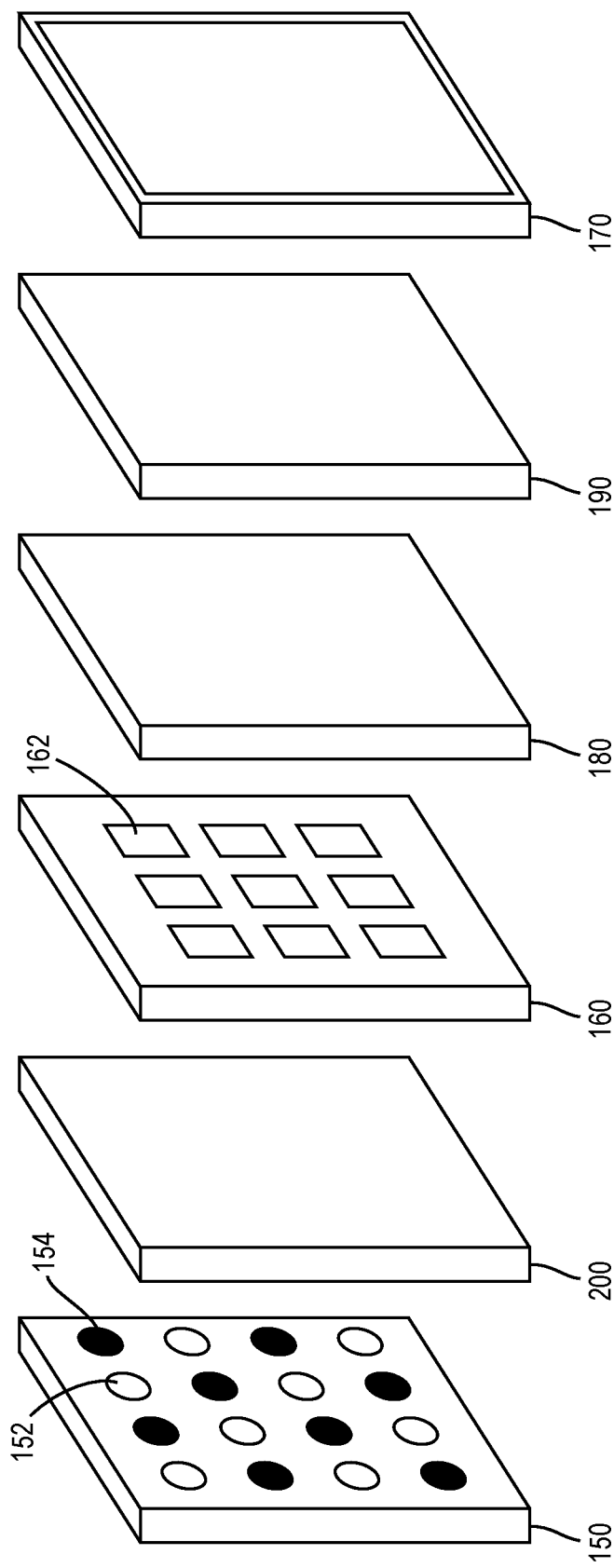
FIG. 2 is an exploded view of the LCD assembly of the LCD of FIG. 1 according to inventive concepts disclosed herein.

FIG. 1 illustrates an embodiment of an LCD 100 according to inventive concepts disclosed herein, where FIG. 2 is an exploded view of the LCD assembly 110 of the LCD 100 of FIG. 1. The LCD 100 includes the LCD assembly 110, a light sensor 125, an LCD power circuit 120, a visible light power circuit 130, a non-visible light power circuit 140 and a controller 145. The LCD assembly 110 includes an LCD panel 160 and a backlight 150.

Referring to FIG. 2, the LCD assembly 110 is shown in further detail. The LCD assembly 110 includes an LCD panel 160 and a backlight 150. The LCD panel 160 includes a plurality of LCD elements 162 arranged in an array. Each of the plurality of LCD elements 162 is configured to change its light transmission based on a voltage applied to the LCD element 162. FIG. 2 represents a typical stack of components and the order and quantity of components may vary. While FIG. 2 illustrates a 3×3 array of LCD elements 162 for ease of illustration, in general the number of LCD elements 162 may be much larger than that of a 3×3 array of LCD elements 162.

The backlight 150 includes one or more visible light elements 152 providing visible light to LCD elements 162 of the LCD panel 160. The visible light elements 152 may provide, for example, white light to the LCD elements 162 of the LCD panel 160. The LCD 100 according to inventive concepts disclosed herein is not limited to visible light elements 152 which provide white light, however. The visible light elements 152 may provide non-white visible light.

The backlight 150 includes one or more non-visible light elements 154, different from the visible light elements 152, and providing non-visible light to the LCD elements 162 of the LCD panel 160. Specifically, the non-visible light elements 154 provide non-visible light to the LCD elements 162 of the LCD panel 160 at a wavelength such that the non-visible light increases the photoconductivity of the LCD elements 162. The increased photoconductivity of the LCD elements 162 provides a reduced decay time of the LCD elements, and thus an increased speed of decay of the image provided by the LCD elements 162, thus reducing the persistent image effect. Both the non-visible light elements 154 and the visible light elements 152 may be light emitting diodes (LEDs), for example.

In general, the non-visible light elements 154 may emit light at any wavelength which is not visible, and which increases the photoconductivity of the LCD elements 162. The non-visible light elements 154 may emit ultraviolet (UV) light or infrared (IR) light, for example. In the case that the non-visible light elements 154 emit UV light, the LCD assembly 110 may include a UV filter 190 arranged between the LCD panel 160 and a cover glass 170 of the LCD assembly 110. The UV filter 190 functions to remove or reduce UV light so as to protect a viewer of the LCD 100, while transmitting visible light.

The LCD 100 may be a color LCD. In this case the LCD assembly 110 may include a color filter 180 to provide colors for the light provided by the LCD panel 160. The color filter 180 provides three different colors for each pixel, such as RGB.

The LCD assembly 110 may include a diffuser 200 arranged near the backlight 150. The diffuser 200 acts to diffuse the light emitted from the different visible light elements 152 so that the individual visible light elements 152 are not seen by a viewer of the LCD 100.

The LCD assembly 110 may include a cover glass 170 arranged on a side of the LCD panel 160 opposite to that of the backlight 150. The cover glass 170 may be transparent to visible light to allow light from the LCD panel 160 to pass through. When the LCD assembly 110 is assembled, the cover glass 170 functions to protect the other elements of the LCD assembly 110.

Referring to FIG. 1, the non-visible light power circuit 140 is arranged to provide power to the at least one non-visible light element 154. The visible light power circuit 130 is arranged to provide power to the at least one visible light element 152. The visible light power circuit 130 may be different from the non-visible light power circuit 140. The LCD power circuit 120 is arranged to provide power to LCD elements 162 of the LCD panel 160.

The controller 145 controls the LCD power circuit 120, the visible light power circuit 130, and the non-visible light power circuit 140. Specifically, the controller 145 controls the LCD power circuit 120 to provide power individually and independently to each of the LCD elements 162 of the LCD panel 160 to set the transmission of each of the LCD elements independently.

The LCD 100 may be a dynamic display. In this case, the controller 145 may control the LCD power circuit 120 to provide power to the LCD elements 162 at a particular refresh rate. The refresh rate may be 60 Hz, for example. The LCD 100 according to inventive concepts disclosed herein, however, are not restricted to a refresh rate of 60 Hz, and other refresh rates are contemplated.

The LCD 100 may be a normally white LCD or a normally black LCD, for example. The LCD elements of a normally white LCD are transparent when no voltage is applied to the LCD elements. For a normally white LCD as the voltage to an LCD element is increased, the transmission of the LCD element decreases. The LCD elements of a normally black LCD are opaque when no voltage is applied to the LCD elements. For a normally back LCD as the voltage to an LCD element is increased, the transmission of the LCD element increases.

The controller 145 controls the visible light power circuit 130 to provide power to the at least one visible light element 152 to set the light intensity provided by the at least one visible light element 152. The controller 145 controls the non-visible light power circuit 140 to provide power to the at least one non-visible light element 154 to set the non-visible light intensity provided by the at least one non-visible light element 154.

The controller 145 may be configured to control the visible light power circuit 130 and the non-visible light power circuit 140 independently. The function of the non-visible light power circuit 140 is to provide light which impinges on the LCD elements 162 to increase their photoconductivity such that the decay time of the LCD elements 162 is decreased, and thus the speed of decay of the image provided by the LCD elements 162 increases. Thus, if the visible light impinging upon the LCD elements, both ambient light as well as light from the visible light elements 152, is insufficient to provide a desired decay time of the LCD elements 162, the controller 145 may control the non-visible light power circuit 140 such that the light from the at least one non-visible light element 154 is sufficient to provide a desired decay time.

Thus, the light from the visible light elements 152 as well as light from the non-visible light elements 154 are controlled such that a desired decay time is maintained. For a constant ambient light environment, as the light from the visible light elements 152 is increased, the light from the non-visible light elements 154 may be decreased such that the desired decay time is maintained. Similarly, for a constant ambient light environment, as the light from the visible light elements 152 is decreased, the light from the non-visible light elements 154 should be increased such that the desired decay time is maintained.

The controller 145 may comprise a processor, for example. The controller 145 may control the LCD power circuit 120, the visible light power circuit 130, and the non-visible light power circuit 140 via a single processor. Alternatively, the controller 145, may comprise sub-processors, each sub-processor controlling one or more of the LCD power circuit 120, the visible light power circuit 130, and the non-visible light power circuit 140. For example, the processor 150 may include a different sub-processor to control each of the LCD power circuit 120, the visible light power circuit 130, and the non-visible light power circuit 140.

The decay time of the LCD is defined as the amount of time it takes for the panel to decay from a set value to a state that is noticeably dimmed or has noticeable display artifacts. An acceptable decay time is defined as the time deemed acceptable for a particular application such that an erroneous action is taken based on the persistent image.

According to inventive concepts disclosed herein, the power to the non-visible light emitting elements 154 may be adjusted to set a decay time of the LCD elements 162 to be an acceptable decay time thus overcoming the persistent image effect for the LCD 100.

Further, the power to the non-visible light emitting elements 154 and the power to the visible light emitting elements 152 may be independently adjusted to set a decay time of the LCD elements 162 to be an acceptable decay time. This allows for the overall power needed for the backlight 150 to be reduced. In bright light ambient conditions light from the non-visible light emitting elements 154 is not needed because the ambient light intensity is sufficient to reduce the decay time to an acceptable time. Thus, in bright light ambient conditions, no power need be provided to the non-visible light emitting elements 154, and power is saved.

Further, the overall power demand of the backlight 150 can be reduced. When the visible light emitting elements 152 are operated to be bright for the display, the power to the non-visible light emitting elements 154 may be controlled to be zero, or at least a low amount.

Further, providing power to the visible light emitting elements 152 independently of providing power to the non-visible light emitting elements 154 via different power circuitry provides advantages upon the occurrence of a failure of the LCD power circuitry 120. That is upon the occurrence of a failure of the LCD power circuitry 120 the non-visible light from the non-visible light emitting elements 154 can be controlled to cause the image provided by the LCD 100 to fade quickly avoiding a hazardously misleading display.

The embodiments of the inventive concepts disclosed herein have been described in detail with particular reference to preferred embodiments thereof, but it will be understood by those skilled in the art that variations and modifications can be effected within the spirit and scope of the inventive concepts.

What is claimed is:

1. A liquid crystal display (LCD), comprising:
   an LCD panel including a plurality of LCD elements arranged in an array, each element configured to change its light transmission based on a voltage applied to the LCD element;
   a backlight configured to provide light to the LCD elements of the LCD panel, the backlight including one or more visible light elements providing visible light to the LCD panel, and including one or more non-visible light elements, different from the visible light elements, providing non-visible light to the LCD panel at a wavelength such that the non-visible light increases photoconductivity of the LCD elements;
   a non-visible light power circuit arranged to provide first power to the at least one non-visible light element;
   a visible light power circuit arranged to provide second power to the at least one visible light element; and
   a controller configured to control the first power provided by the non-visible light power circuit to increase the amount of light emitted by the at least one non-visible light element when ambient light impinging on the LCD element decreases.

2. The LCD of claim 1, wherein the one or more non-visible light elements emit ultraviolet (UV) light or infrared (IR) light.

3. The LCD of claim 1, wherein the one or more non-visible light elements include light emitting diodes (LEDs).

4. The LCD of claim 1, wherein the one or more visible light elements include light emitting diodes (LEDs).

5. The LCD of claim 1, wherein the one or more non-visible light elements emit UV light, and the LCD further comprises a UV filter arranged to transmit the visible light and block UV light.

6. The LCD of claim 1, wherein each LCD element is opaque when no voltage is applied to the LCD element.

7. The LCD of claim 1, wherein each LCD element is transparent when no voltage is applied to the LCD element.

8. The LCD of claim 1, wherein each LCD element corresponds to a different pixel.

9. A method of operating a liquid crystal display (LCD) including an LCD panel having a plurality of LCD elements arranged in an array, each element configured to change its light transmission based on a voltage applied to the LCD element, the method comprising:
   providing visible light to the LCD panel via one or more visible light elements;
   providing non-visible light to the LCD panel, via one or more non-visible light elements different from the visible light elements, at a wavelength such that the non-visible light increases photoconductivity of the LCD elements; and
   controlling first power provided to the one or more one non-visible light elements to increase the amount of light emitted by the at least one non-visible light element when ambient light impinging on the LCD elements decreases.

10. The method of claim 9, wherein the one or more non-visible light elements emit ultraviolet (UV) light or infrared (IR) light.

11. The method of claim 9, wherein the one or more non-visible light elements emit ultraviolet (UV) light, and further comprising: blocking UV light from being transmitted to a user of the LCD.

12. The method of claim 9, wherein each LCD element corresponds to a different pixel.

13. The method of claim 9, wherein each LCD element is opaque when no voltage is applied to the LCD element.

14. The method of claim 9, wherein each LCD element is transparent when no voltage is applied to the LCD element.

15. The LCD of claim 1, wherein the non-visible light power circuit is different from the visible light power circuit.

16. The LCD of claim 1, wherein increasing the photoconductivity of the LCD elements with the non-visible light increases a speed of decay of an image provided by the LCD elements.

17. The LCD of claim 1, wherein the visible light elements are configured to provide non-white visible light to the LCD elements.

18. The method of claim 9, wherein the at least one non-visible light elements are provided with the first power by a non-visible light power circuit and the one or more visible light elements are provided with second power by a visible light power circuit that is different than the non-visible light power circuit.

19. The method of claim 9, wherein increasing the photoconductivity of the LCD elements with the non-visible light increases a speed of decay of an image provided by the LCD elements.

20. The method of claim 9, wherein providing visible light to the LCD panel comprises providing non-white visible light.

* * * * *